United States Patent
Maki (10) Patent No.: US 8,590,289 B2
(45) Date of Patent: Nov. 26, 2013

(54) DETERIORATION DIAGNOSTIC DEVICE FOR AN EXHAUST GAS PURIFIER

(75) Inventor: Hidetaka Maki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1217 days.

(21) Appl. No.: 10/972,776

(22) Filed: Oct. 26, 2004

(65) Prior Publication Data

US 2005/0138917 A1  Jun. 30, 2005

(30) Foreign Application Priority Data

Oct. 30, 2003  (JP) ................................. 2003-370551

(51) Int. Cl.
  *F01N 3/00*  (2006.01)

(52) U.S. Cl.
  USPC ............... 60/277; 60/274; 60/276; 60/285; 701/103; 701/109

(58) Field of Classification Search
  USPC ............ 60/274, 276, 277, 285; 701/103, 104, 701/107, 109
  See application file for complete search history.

(56) References Cited

U.S. PATENT DOCUMENTS

| | | | | |
|---|---|---|---|---|
| 5,363,648 A | * | 11/1994 | Akazaki et al. | 60/276 |
| 5,365,216 A | * | 11/1994 | Kotwicki et al. | 340/439 |
| 5,404,718 A | * | 4/1995 | Orzel et al. | 60/274 |
| 5,627,757 A | * | 5/1997 | Comignaghi et al. | 701/103 |
| 5,953,910 A | | 9/1999 | Sato et al. | |
| 5,983,629 A | * | 11/1999 | Sawada | 60/276 |
| 6,151,888 A | * | 11/2000 | Schneider et al. | 60/274 |
| 6,449,944 B1 | * | 9/2002 | Yasui et al. | 60/277 |
| 6,591,605 B2 | * | 7/2003 | Lewis | 60/285 |
| 6,799,419 B2 | * | 10/2004 | Rosel et al. | 60/277 |
| 2001/0002539 A1 | | 6/2001 | Zhang | |

FOREIGN PATENT DOCUMENTS

| | | |
|---|---|---|
| EP | 0 823 546 A1 | 2/1998 |
| JP | 06-129240 | 5/1994 |
| JP | 06-193437 | 7/1994 |
| JP | 07-269330 | 10/1995 |
| JP | 08-144745 | 6/1996 |
| JP | 2003-193898 | 7/2003 |

OTHER PUBLICATIONS

International Publication No. WO 99/23371, published May 14, 1999.

* cited by examiner

*Primary Examiner* — Binh Q Tran
(74) *Attorney, Agent, or Firm* — Arent Fox LLP (57) ABSTRACT

The invention provides a deterioration diagnostic device for diagnosing a degradation condition of an exhaust gas purifier disposed in an exhaust passage in an engine based on a sensor value of an exhaust gas sensor that is disposed downstream of the purifier. The device includes detecting-signal generating unit for generating a detecting-signal having particular frequency components and multiplying the generated signal to a basic fuel injection amount so as to calculate a fuel injection amount and exhaust gas purifier evaluating for extracting a frequency response corresponding to the detecting-signal from an output of the exhaust gas sensor of the engine, the output being in response to the calculated fuel injection amount, so as to determine a condition of the purifier based on the extracted frequency response.

6 Claims, 9 Drawing Sheets

3HZ=Detecting Signal Frequency fid

Example of Frequency Characteristic of
Bandpass Filter

(a) Deteriorating Catalyst (b) Normal Catalyst

Catalyst Deterioration Parameter CAT_DLYP

FIG. 7

Catalyst Deterioration Parameter CAT_AVE

DETERIORATION DIAGNOSTIC DEVICE FOR AN EXHAUST GAS PURIFIER

BACKGROUND OF THE INVENTION

The present invention relates to a device for determining a deterioration condition of an exhaust gas purifier disposed in an exhaust passage in an internal-combustion engine (hereinafter referred to as an "engine").

An exhaust gas purifier (catalyst) is disposed in an exhaust passage of an engine of a vehicle in order to purify exhaust gas from the engine. The catalyst purifies the exhaust gas by oxidizing or reducing hydrocarbon HC, nitrogen oxide NOx and carbon monoxide CO which are three major pollutants discharged from the engine.

However, as the usage time of the catalyst passes on, an effective surface area of the catalyst gradually decreases, resulting in deterioration of the catalyst. When the deterioration increases, purification of the pollutants does not work properly and a proportion of the pollutants in the exhaust gas emitted to the atmosphere increases, which may exert a bad influence upon the environment.

Therefore, it is important in the purification of the exhaust gas to detect the deterioration condition of the catalyst. There are disclosed some techniques as an approach for diagnosing such deterioration condition of the catalyst. The National Entry Publication (Kohyo) No. 2001-522015 discloses a technique for evaluating efficiency of a catalytic converter by changing an air-fuel ratio vibrationally and using an output signal of an oxygen sensor. The Japanese Patent Application Unexamined Publication (Kokai) No. HEI7-269330 discloses a technique for evaluating responsiveness of a catalyst based on a response time of an exhaust gas sensor disposed downstream of the catalyst when a step-wise change is given to fuel by a fuel-cut or the like.

The Japanese Patent No. 2938288 discloses a technique for determining deterioration of a catalyst based on a result of comparison between an output of an air-fuel ratio sensor disposed downstream of the catalyst and a filtered value of the output of the air-fuel ratio sensor. Besides, the Japanese Patent No. 3216067 discloses a technique for determining deterioration of a catalyst based on a phase difference in respective sensor values on the upstream side and downstream side of the catalyst.

The technique disclosed in Kokai No. 2001-522015 determines a capability of the catalyst based on an attenuation of the high-frequency components in the remaining signal of the sensor output from which the filtered output is subtracted. However, this technique has a problem of poor accuracy because it determines the catalyst capability based on only the positive value signal of the remaining signal. At present, a need for detecting a deterioration condition of an exhaust gas purifier more precisely is increasing in order to cope with reinforcement of the emission control.

Besides, the technique disclosed in the Kokai No. HEI7-269330 determines a deterioration condition of the catalyst based on a response time when the step-wise change is applied to the fuel. However, the response time may change depending on the condition of the catalyst such as the amount of O2 stored in the catalyst. Furthermore, the response time may change depending on the influence of the A/F ratio spike due to the transient operation.

Thus, it is an objective of the present invention to provide a catalyst evaluation technique for evaluating presence/absence of deterioration of the catalyst more precisely with little influence by a catalyst condition at the evaluation time.

SUMMARY OF THE INVENTION

According to the present invention, there is provided a deterioration diagnostic device for diagnosing a degradation condition of an exhaust gas purifier disposed in an exhaust passage in an internal-combustion engine based on output of an exhaust gas sensor that is disposed downstream of the exhaust gas purifier. The device includes detecting-signal generating means for generating a detecting-signal having particular frequency components and multiplying the generated detecting-signal to a basic fuel injection amount so as to calculate a fuel injection amount and exhaust gas purifier evaluating means for extracting a frequency response corresponding to the detecting-signal from an output of the exhaust gas sensor of the engine, the output being in response to the calculated fuel injection amount, so as to determine a condition of the exhaust gas purifier based on the extracted frequency response. According to this invention, a proportion of the detecting-frequency components contained in the exhaust gas can be kept at a high level because the fuel amount multiplied by the detecting-signal having a specific frequency is supplied. Besides, in such situation, the condition of the exhaust gas purifier can be diagnosed based on the frequency response in the frequency of the output of the exhaust gas sensor, so that a proportion of noise elements contained in the exhaust gas can be easily decreased and precision for determining the deterioration of the exhaust gas purifier can be improved.

According to one aspect of the invention, the detecting-signal to be multiplied to the basic fuel injection amount is a signal obtained by adding a single trigonometric function wave or a composite wave formed by two or more trigonometric function waves to a predetermined offset value. According to this aspect of the invention, the response of the specific frequency can be used for evaluating the purifier by using the signal that can be easily generated to have the sufficient proportion of the frequency components for the detection while maintaining the magnitude of the detecting-frequency components in the exhaust gas, so that the detection precision for the deterioration of the exhaust gas purifier can be further improved. Besides, the composite wave formed by two or more trigonometric function waves each having different frequency is given in such operating range where detection is especially difficult, so that the response of two or more frequencies can be used to determine the condition of the exhaust gas purifier. The detection precision of the deterioration failure of the exhaust gas purifier can be further improved because the trigonometric function waves are composed to form a desired specific waveform that allows easy determination of the condition of the exhaust gas purifier and such composed trigonometric function wave is reflected in the fuel injection amount.

According to another aspect of the invention, the exhaust gas purifier evaluating means determinates the condition of the exhaust gas purifier when a predetermined time elapses since the fuel injection amount has been supplied to the engine. According to this aspect of the invention, the determination of the exhaust gas purifier condition can be performed stably by avoiding such unstable state of the exhaust gas air-fuel ratio that may appear at the time immediately after the detecting-signal has been reflected on the fuel. Accordingly, the detection precision for the deterioration of the exhaust gas purifier can be further improved.

According to a further aspect of the invention, the exhaust gas purifier evaluating means determinates the condition of the exhaust gas purifier by using an output from the exhaust gas sensor after having applied a bandpass filtering on the output. According to this aspect of the invention, the other frequency components, which are contained in the exhaust gas, except for the detecting-frequency, are removed because those frequencies are noises when the condition of the exhaust gas purifier is determined. Accordingly, the detection precision for the deterioration of the exhaust gas purifier can be further improved.

According to yet further aspect of the invention, the exhaust gas purifier evaluating means determines that the exhaust gas purifier is in failure when a value obtained by an integral calculation or a smoothing calculation upon absolute values of the bandpass-filtered outputs from the exhaust gas sensor exceeds a predetermined value. According to this aspect of the invention, the detection precision for the deterioration of the exhaust gas purifier can be further improved because the variations in the outputs from the exhaust gas sensor can be averaged.

According to an embodiment of the invention, the deterioration diagnostic device further includes a second exhaust gas sensor that is disposed upstream of the exhaust gas purifier in the exhaust gas passage and air-fuel ratio controlling means for controlling an air-fuel ratio to be supplied to the engine to a predetermined value based on at least an output of the second exhaust gas sensor. The fuel injection amount is corrected in accordance with a feedback coefficient that is determined based on the output of the second exhaust gas sensor. According to this aspect of the invention, the fuel injection amount is corrected such that a drift toward rich or lean which is caused by applying the detecting-signal to the fuel injection amount can be suppressed. As a result, the decrease of the catalyst purification rate that may occur due to the detection technique of the present invention can be prevented while the detection precision for the catalyst deterioration can be maintained.

According to another embodiment of the invention, the air-fuel ratio controlling means adjusts a predetermined parameter in the air-fuel ratio controlling means so as to suspend the control of the air-fuel ratio or slow down a changing speed of the feedback coefficient when supplying the fuel injection amount to the engine. The fuel injection amount is corrected such that a drift toward rich or lean which is caused by applying the detecting-signal to the fuel injection amount can be suppressed. As a result, the decrease of the catalyst purification rate that may occur due to the detection technique of the present invention can be prevented so as to maintain the detection precision while suppressing the increase of the emitted amount of the harmful constituents contained in the exhaust gas.

BRIEF DESCRIPTION OF THE DRAWINGS

FIG. 9 shows a flowchart of one embodiment of the present invention including a method for suspending a feedback operation and the like.

DESCRIPTION OF THE PREFERRED EMBODIMENTS

1. Description of Functional Blocks

Figure 1:
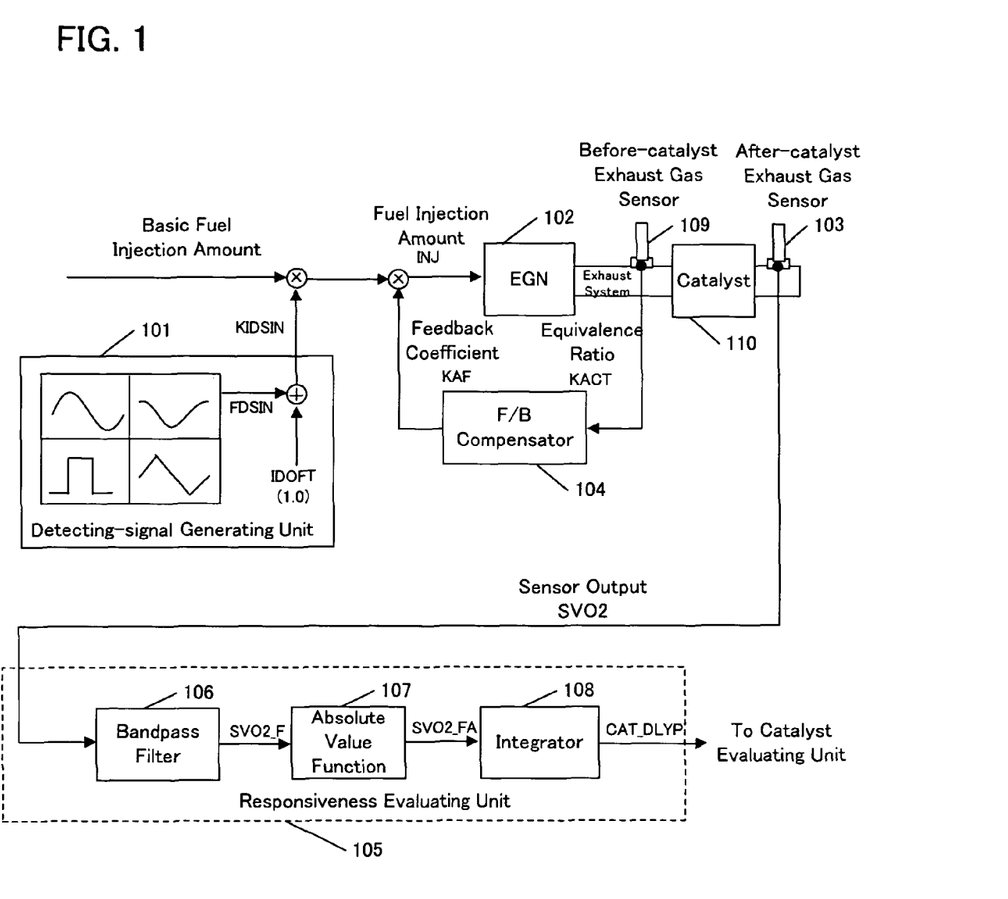
FIG. 1 is a schematic diagram showing a catalyst deterioration diagnostic device according to one embodiment of the present invention.

Each functional block will be described with reference to FIG. 1 and FIG. 2. FIG. 1 is a schematic diagram of an overall structure for describing a concept of the present invention.

A detecting-signal generating unit 101 has a function of generating a predetermined detecting-signal KIDSIN in which a trigonometric function wave FDSIN or the like is superimposed on an offset value IDOFT. A responsiveness evaluating unit 105 has a function of performing a bandpass filtering upon an output from an after-catalyst exhaust gas sensor 103, then converting the filtered value to an absolute value, further integrating the converted values over a predetermined time period and finally transmitting the integral value to a catalyst evaluating unit. The output of the after-catalyst exhaust gas sensor 103 may be, for example, an equivalence ratio KACT which is a linear AF (LAF) sensor output, a voltage SVO2 of an oxygen sensor output, an output of a hydro-carbon sensor or a nitrogen oxides sensor or the like. In the following description, the voltage SVO2 of the oxygen sensor output will be used.

The catalyst evaluating unit has a function of determining degradation of a catalyst based on these values. The above-described catalyst evaluating unit, detecting-signal generating unit 101 and responsiveness evaluating unit 105 can be implemented in an ECU (electronic control unit), so the operation of each unit will be described in detail later in association with the description of the ECU and a catalyst degradation diagnostic process.

An engine 102 is such internal-combustion engine in which a fuel injection amount can be controlled by an injection controller based on a calculated value in a fuel amount calculating unit.

A before-catalyst exhaust gas sensor 109, which is a LAF sensor (a wide-range air-fuel ratio sensor) in this embodiment, is such sensor that detects an air-fuel ratio extending over a wide range from rich to lean upon the exhaust gas discharged from the engine 102 to generate an equivalence ratio KACT.

A feedback compensator 104 has a function of generating a feedback coefficient KAF to be used for keeping the air-fuel ratio at an appropriate level based on the output value from the LAF sensor 109.

Figure 2:
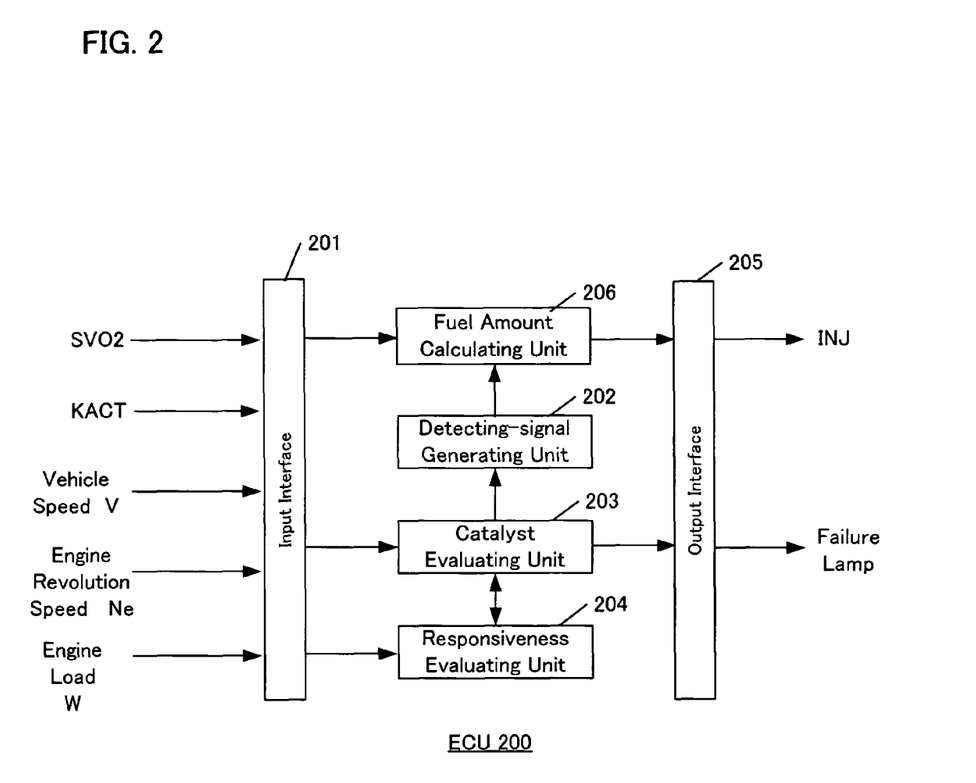
FIG. 2 shows an example of an ECU to be used in a catalyst deterioration diagnostic device according to one embodiment of the present invention.

The above-described functions of the catalyst evaluating unit, detecting-signal generating unit 101 and responsiveness evaluating unit 105 can be realized integratedly by the ECU shown in FIG. 2. FIG. 2 schematically shows an overall structure of an electronic control unit (ECU) 200. In this embodiment, the functions of the catalyst evaluating unit 203, the detecting-signal generating unit 202, and the responsiveness evaluating unit 204 are integrated into such usual ECU for controlling an engine system including the fuel amount calculating unit 206 and so on, although the ECU may be structured to be a dedicated controller for diagnosing the catalyst degradation. The ECU 200 is provided with a processor for performing various computations, a Random Access Memory (RAM) for providing storage areas for temporarily storing various data and a working space for the computations by the processor, a Read-Only Memory (ROM) for pre-stored programs to be executed by the processor and various data required for the computations and a re-writable non-volatile memory for storing computation results by the processor and the data to be stored among the data obtained from each section of the engine system. The non-volatile memory can be implemented with a RAM with a backup capability to which certain voltage is always supplied even after suspension of the system.

An input interface 201 interfaces between the ECU 200 and each section of the engine system. The input interface 201 receives information, indicating operating conditions of the vehicle, which is transmitted from various sections of the engine system, processes a signal, converts analog information to digital signals and then delivers those signals to the fuel amount calculating unit 206, the catalyst evaluating unit 203 and the responsiveness evaluating unit 204. Although the output voltage SVO2 from the after-catalyst exhaust gas sensor, the KACT value that is output from the LAF sensor 109, a vehicle speed V, an engine revolution speed Ne and an engine load W are shown as inputs to the input interface 201 in FIG. 2, the inputs are not limited to those values but any other various information may be input.

The detecting-signal generating unit 202 has a function of generating a predetermined detecting-signal KIDSIN. The detecting-signal is generated by adding a trigonometric function wave FDSIN or the like to an offset value IDOFT based on a command from the catalyst evaluating unit 203. This detecting-signal KIDSIN will be described later in association with a process for diagnosing the catalyst deterioration.

The catalyst evaluating unit 203 performs a necessary calculation and determination of the condition for executing a process for diagnosing the catalyst deterioration based on the data delivered from the input interface 201 (this process will be described later). In addition, this unit 203 controls the detecting-signal generating unit 202 and the responsiveness evaluating unit 204. In accordance with a command from the catalyst evaluating unit 203, the responsiveness evaluating unit 204 performs a bandpass filtering upon an output SVO2 from the after-catalyst exhaust gas sensor 103, converting the filtered value to an absolute value, and then integrates the converted values over a predetermined time period. These functions will be described in detail later in association with a process for diagnosing the catalyst deterioration.

The fuel amount calculating unit 206 has a function of receiving the detecting-signal KIDSIN generated by the detecting-signal generating unit 202, multiplying the detecting-signal to a basic fuel injection amount and then providing the resulted fuel injection amount INJ to an output interface 205.

The output interface 205 has a function of providing the fuel injection amount INJ to an injection function of the engine. Besides, the output interface 205 receives a control signal from the catalyst evaluating unit 203 and provides an output to a failure lamp. However, the functions of the output interface 205 are not limited to these ones, but any other controller or the like can be connected to the output interface 205.

2. Description of a Process for Diagnosing degradation of a Catalyst

Following will describe a catalyst degradation diagnostic process for diagnosing a degradation failure of the catalyst 110.

Figure 3:
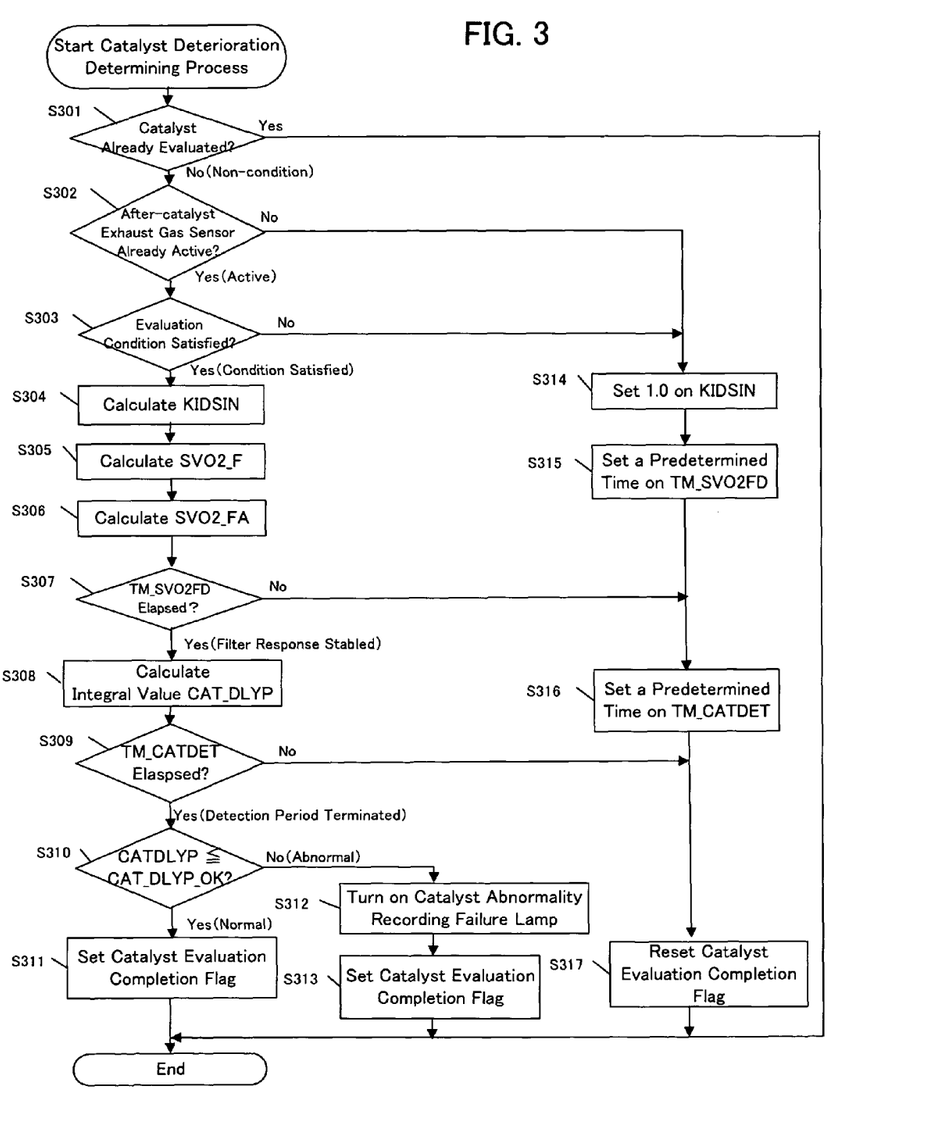
FIG. 3 shows a flowchart of one embodiment of the present invention.

In FIG. 3, when the catalyst degradation diagnostic process is invoked from a main program, the catalyst evaluating unit 203 checks a catalyst evaluation completion flag to determine whether the degradation of the catalyst has already been evaluated (S301). Initially, since the catalyst evaluation is not performed yet, the catalyst evaluation completion flag is being set to 0, so the process goes to Step S302.

In Step S302, the catalyst evaluating unit 203 determines whether the after-catalyst exhaust gas sensor has already been activated. When only a short time elapses after the engine start, the after-catalyst exhaust gas sensor is not activated sufficiently. Therefore, when a predetermined time does not elapse after the start of the engine, the catalyst evaluating unit 203 proceeds the process to Step S314. In Step S314, the catalyst evaluating unit 203 sends a command to the detecting-signal generating unit 202 to set a constant value of 1.0 on IDOFT and a constant value of 0 on FDSIN and then generate a composite signal KIDSIN by adding the IDOFT and the FDSIN together (at this time point, the composite signal KIDSIN becomes 1.0). The KIDSIN is a coefficient to be multiplied to a basic fuel injection amount so as to output a fuel injection amount to be actually injected by the injection function. Accordingly, when the KIDSIN is 1.0, the basic fuel injection amount to be used in a normal operation time is injected from the injection function.

Subsequently, the catalyst evaluating unit 203 sets a predetermined time on an integration starting timer TM_SVO2FD and starts a countdown of the timer TM_SVO2FD (S315). The predetermined time to be set on the integration starting timer TM_SVO2FD in this step is a time until a response to the fuel injection reflecting the detecting-signal is stably output, from performing the fuel injection reflecting the detecting-signal after the condition for the catalyst evaluation has been satisfied. Thus, by setting the timer in order for an integration (which will be described later) to start when the predetermined time has elapsed, the response can be evaluated except for such unstable state that may happen just after the detecting-signal has been reflected in the fuel injection amount, so that the detection accuracy can be improved.

After setting the predetermined time on the integration starting timer TM_SVO2FD, the catalyst evaluating unit 203 sets a predetermined time on an integration duration timer TM_CATDET and then starts a countdown of the timer TM_CATDET (S316). The predetermined time to be set on the timer TM_CATDET is an integration duration time over which an integral operation is performed upon absolute values. The resulted integral value is to be used for determination of the catalyst deterioration. After setting the integration duration timer TM_CATDET, the catalyst evaluating unit 203 resets the catalyst evaluation completion flag to 0 (S317) and then terminates this process.

After the above-described termination of the process, the catalyst deterioration diagnostic process is evoked again by the main program. When the catalyst evaluation completion flag has been reset in the above-described process and when the after-catalyst exhaust gas sensor becomes active after the predetermined time has elapsed since the start of the engine, the catalyst evaluation unit 203 proceeds the process from Step S301 to Step S303 to determine whether an evaluation condition is satisfied. The evaluation condition means such state that a vehicle speed V, an engine revolution speed Ne and an engine load W are within their respective predetermined ranges. Therefore, the catalyst evaluating unit 203 obtains the vehicle speed V, the engine revolution speed Ne and the engine load W through the input interface 201 to determine whether or not all of these values are within the respective predetermined ranges. When this condition is not satisfied, the process proceeds to Step S314. The operations in Step S314 and the subsequent steps are the same as described above.

Figure 4:
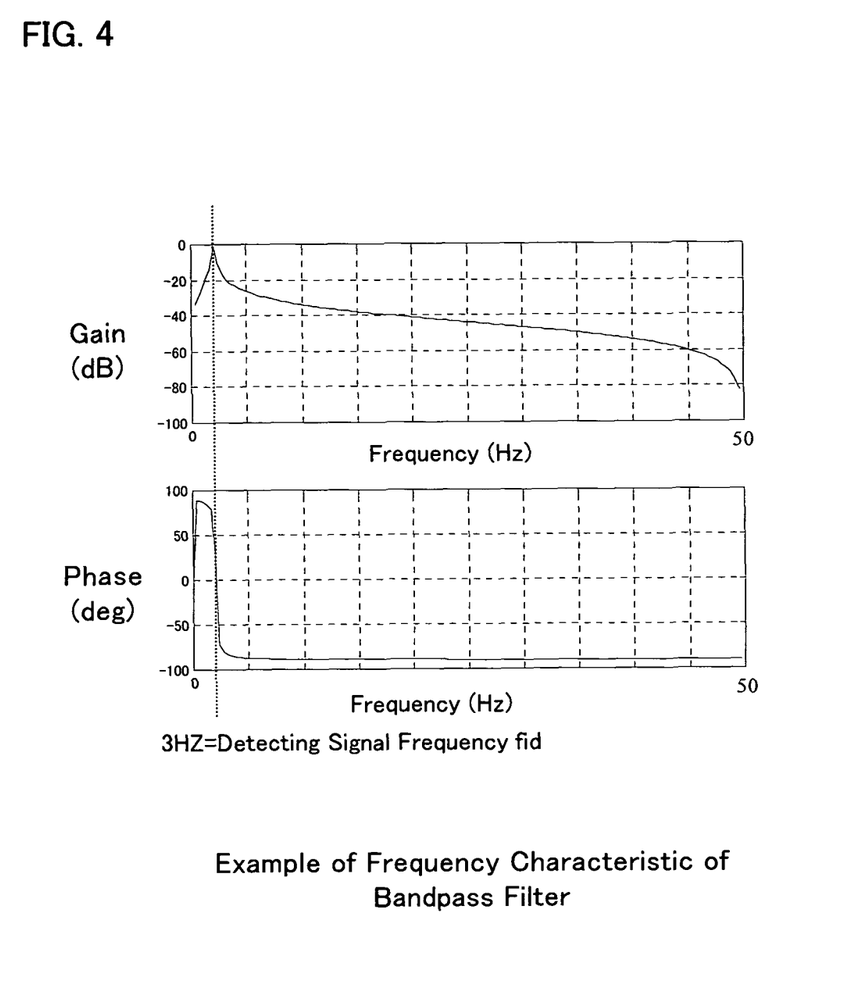
FIG. 4 schematically shows exemplary characteristics of a bandpass filter frequency used in the present invention.

When all of the above-described evaluation conditions are satisfied, the catalyst evaluating unit 203 sends a request for calculating a detecting-signal KIDSIN including a trigonometric function wave or the like to the detecting-signal generating unit 202. Upon receiving the request for the calculation of KIDSIN, the detecting-signal generating unit 202 first generates a sine wave FDSIN with a frequency fid (3 Hz is used in this example) and an amplitude aid (0.03 in this example) and then adds an offset amount (1.0 in this example) to the generated sine wave FDSIN so as to obtain a KIDSIN (namely, 1.0+0.03*sin 6πt in this example) in Step S304. This detecting-signal KIDSIN containing the sine wave is continuously transmitted to the fuel amount calculating unit 206. Upon receiving the detecting-signal KIDSIN, the fuel amount calculating unit 206 multiplies a basic fuel injection amount to the KIDSIN to obtain a fuel injection amount INJ. This fuel injection amount INJ is input to the injection function of the engine 102 through the output interface 205. As the engine is operated in accordance with such fuel injection amount INJ, the exhaust gas, which is an output corresponding to the fuel injection amount INJ as an input, is emitted from an exhaust system of the engine. Then, the after-catalyst exhaust gas sensor 103 detects the emitted exhaust gas downstream of the catalyst and inputs its output SVO2 to the responsiveness evaluating unit 204 through the input interface 201. The responsiveness evaluating unit 204 substitutes the SVO2 into the following equation in order to calculate a bandpass-filtered output SVO2_F (S305).

$$SVO2\_F(k) = a1 SVO2\_F(k-1) + a2 SVO2\_F(k-2) + a3 SVO2\_F(k-3) + b0 SVO2(k) + b1 SVO2(k-1) + b2 SVO2(k-2) + b3 SVO2(k-3)$$

where a1, a2, a3, b0, b1, b2 and b3 are filtering coefficients. A frequency characteristic of the bandpass filter used herein is to pass through a frequency of 3 Hz that is the same as that of the detecting-signal as shown in FIG. 4.

Figure 5:
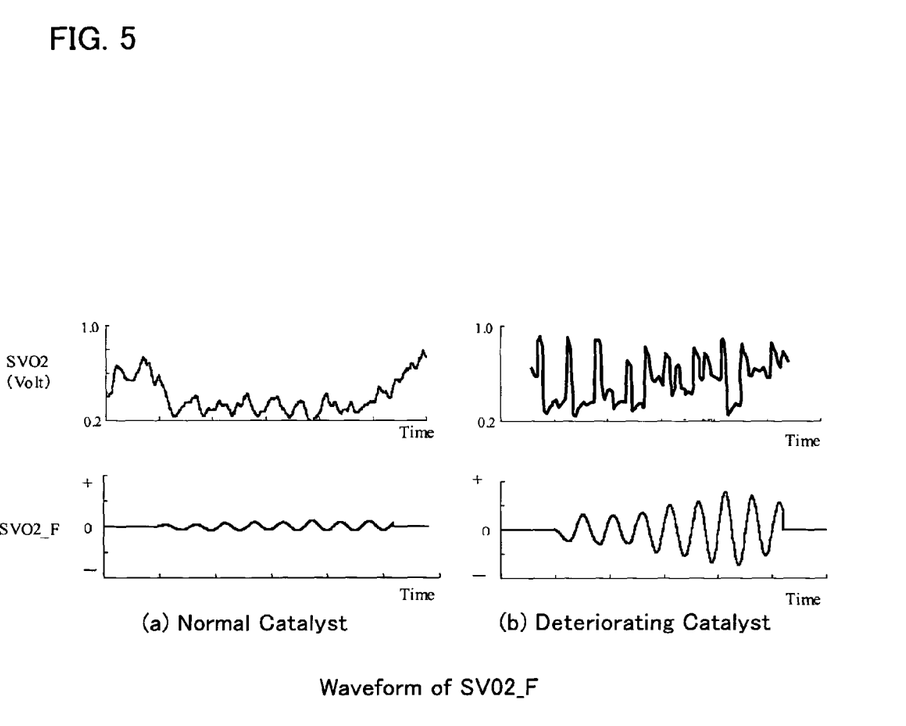
FIG. 5 schematically shows an example of a waveform of an oxygen sensor output SVO2_F.
Figure 6:
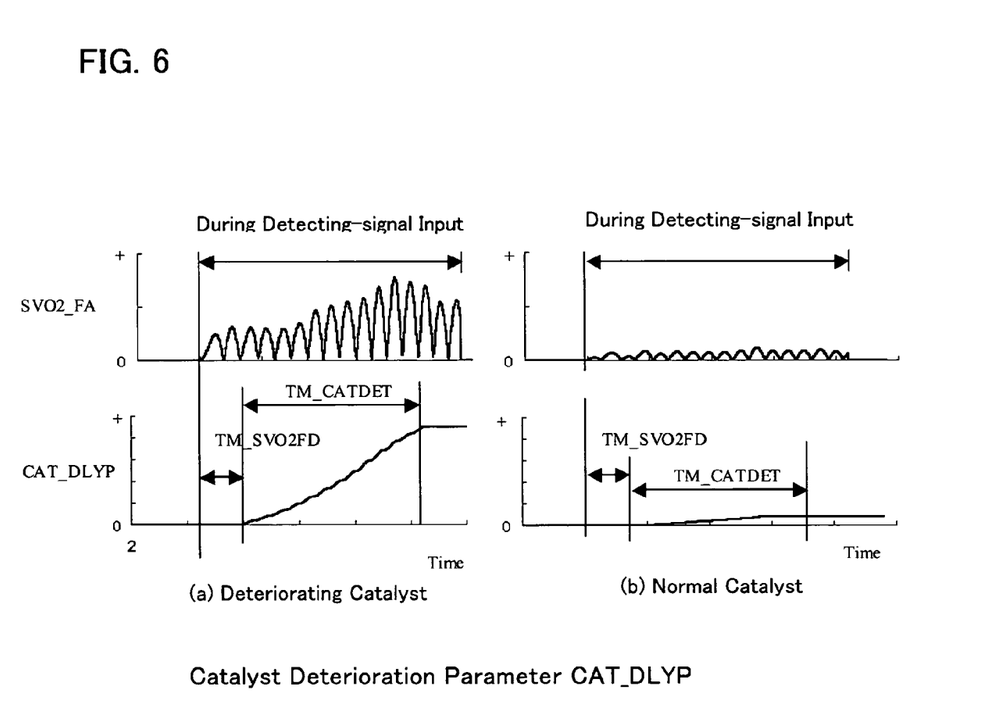
FIG. 6 schematically shows an example of a catalyst deterioration parameter CAT_DLYP.

After having calculated the filtered output value SVO2_F (FIG. 5), the responsiveness evaluating unit 204 calculates an absolute value SVO2_FA from the SVO2_F (S306). Upon completion of the calculation of the absolute value SVO2_FA in the responsiveness evaluating unit 204, the catalyst evaluating unit 203 determines whether the integration starting timer TM_SVO2FD is 0 (S307). When the timer TM_SVO2FD is not 0, the catalyst evaluating unit 203 proceeds the process to Step S316. Operations in Step S316 and the subsequent steps are the same as described above. On the other hand, when the integration starting timer TM_SVO2FD is 0, the catalyst evaluating unit 203 informs the responsiveness evaluating unit 204 that the timer condition is satisfied. Upon such information, the responsiveness evaluating unit 204 starts a successive calculation of an integral value CAT_DLYP (S308). Specifically, the integral calculation is performed every time this process is invoked and the step S308 is carried out. Specifically, a value obtained by multiplying a small time value Δt to the absolute value SVO2_FA is added to the previous integral value that has been calculated in the previous integral calculation run, so that the current integral value is obtained. FIG. 6 shows an example of result of the integral value CAT_DLYP relative to the continuous time in a horizontal axis.

Upon completion of the calculation of CAT_DLYP in the responsiveness evaluating unit 204, the catalyst evaluating unit 203 determines whether the integration duration timer TM_CATDET is 0. When the timer TM_CATDET is not 0, the process proceeds to Step S317. Operations in Step S317 and the subsequent steps are same as above described. On the other hand, when the integration duration timer TM_CATDET is 0, the responsiveness evaluating unit 204 transmits the current integral value CAT_DLYP to the catalyst evaluating unit 203, and then the process goes to Step S310. In Step S310, the catalyst evaluating unit 203 determines whether or not the integral value CAT_DLYP is equal to or less than a predetermined value CAT_DLYP_OK. The CAT_DLYP_OK value is a threshold value for determination, based on the integral value CAT_DLYP, whether the catalyst has deteriorated. When the integral value CAT_DLYP is equal to or less than the determination value CAT_DLYP_OK, the catalyst evaluating unit 203 determines that the catalyst does not deteriorate, sets the catalyst evaluation completion flag to 1 (S311) and terminates this process.

On the other hand, when the integral value CAT_DLYP exceeds the determination value CAT_DLYP_OK, the catalyst evaluating unit 203 determines that the catalyst has deteriorated and turns on a catalyst abnormality recording failure lamp through the output interface 205 (S312). Then, the unit 203 sets the catalyst evaluation completion flag to 1 (S313) and terminates this process.

Figure 7:
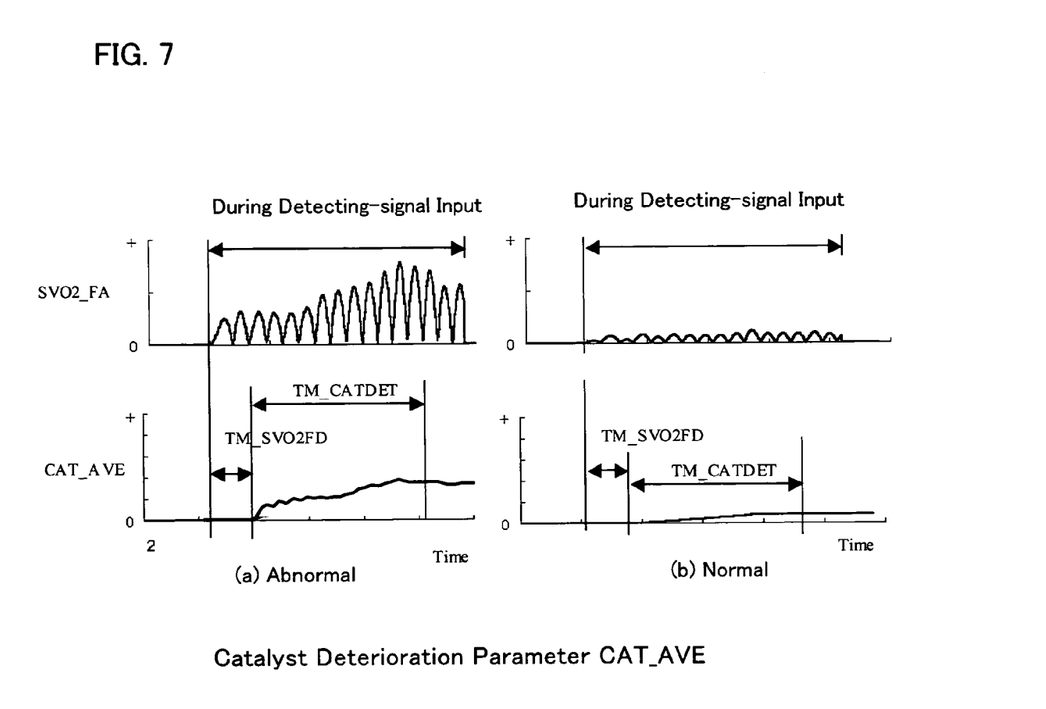
FIG. 7 schematically shows an example of a catalyst deterioration parameter CAT_AVE.

As an alternative method for determining the degradation condition, rather than determining the degradation of the catalyst based on the integral value CAT_DLYP calculated in Step S308, such smoothing calculation is performed as shown in FIG. 7 in which a moving average for the integral values SVO2_FA is calculated, and then the deterioration of the catalyst may be determined based on such smoothed value CAT_AVE. Following is an example of an equation for calculating a smoothed value CAT_AVE:

$$CAT\_AVE = (1-C_1) \times SVO2\_FA_{i-1} + C_1 \times SVO2\_FA_i$$

where $C_1$ represents a smoothing coefficient.

In this case, in Step S310, the catalyst evaluating unit 203 determines whether or not the smoothed value CAT_AVE is equal to or less than a determination value CAT_AVE_OK to be used in association with the smoothed value CAT_AVE. When the smoothed value CAT_AVE exceeds the determination value CAT_AVE_OK, the catalyst evaluating unit 203 determines that the catalyst has deteriorated. On the other hand, when the value CAT_AVE is equal to or less than the determination value CAT_AVE_OK, the catalyst evaluating unit 203 determines that the catalyst does not deteriorate.

According to the present invention, the engine is given the fuel injection amount that is multiplied by such detecting-signal as a sine wave variation to be used for evaluating the catalyst, and then the presence/absence of the catalyst deterioration is evaluated based on the subsequent outputs from the exhaust gas sensor. Therefore, the catalyst evaluation may be less influenced by the air-fuel ratio variation due to the transient operation and/or the condition of the oxygen adsorption of the catalyst. Thus, the detection accuracy can be improved as well as the detection range can be expanded.

Besides, although the sine wave is used as a detecting-signal in the above-described embodiment, the same effect can be obtained by using either a trigonometric function wave of a single frequency, a rectangle wave or a trigonometric wave, or a composite wave including a plurality of these waves. In either case, when the detecting-signal has a limitation in the amplitude, the spectrum components of the desired single frequency or the multiple frequencies can be expanded, so that the precision for detecting the catalyst deterioration against the noise can be enhanced.

Besides, by using the bandpass-filtered outputs, in addition to an effect of keeping the detection frequencies at a constant level, noise elements can be eliminated at the time of the measurement because the frequency components except for the frequency to be used for the detection can be removed. The detection precision can be further improved by eliminating the influence of the other frequency components caused by the air-fuel ratio variation or the like that may occur in particular at the time of the transient operation.

Moreover, because the deterioration failure of the catalyst is determined based on the smoothed value including the average value or the integral value over the predetermined time period for the absolute values of the bandpass-filtered output waves, the influence of an eruptive spike of air-fuel ratio or the like caused by the engine load variation or the like can be removed from the evaluation for the detection of the catalyst deterioration, so that the precision of the deterioration failure determination can be further improved.

Figure 8:
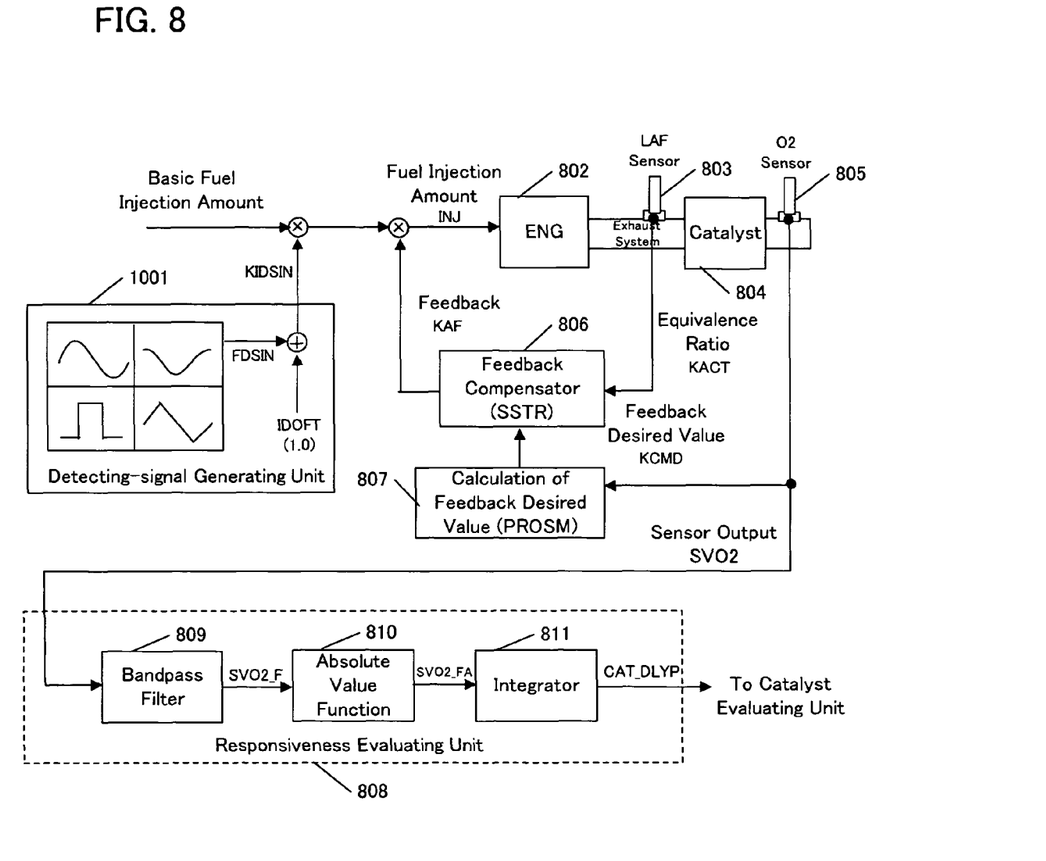
FIG. 8 is a schematic diagram showing a catalyst degradation diagnostic device where another method for calculating a feedback coefficient is used.

Furthermore, optionally, a feedback control may be applied to the calculation of the fuel injection amount. Specifically, as shown in FIG. 1 and FIG. 8, the value KACT is input to a feedback compensator in order to calculate a feedback coefficient KAF for controlling the air-fuel ratio (supplied to the engine) to a predetermined value. Then, the result of the multiplication of the basic fuel injection amount by the KIDSIN value is further multiplied by this feedback coefficient KAF to generate an actual fuel injection amount. As for this feedback control case, the embodiment using the ECU is structured to connect the feedback compensator (not shown) to the fuel amount calculating unit 206.

According to the present invention, the fuel injection amount is corrected based on the feedback coefficient that is determined based on either the output of the before-catalyst exhaust gas sensor or the output of the after-catalyst exhaust gas sensor or the outputs of both sensors, so that a drift toward rich or lean which is caused by applying the detecting-signal to the fuel injection amount can be suppressed. As a result, the decrease of the catalyst purification rate that may occur during the degradation failure diagnostic process for the catalyst can be suppressed and the increase of the emitted amount of the harmful constituents contained in the exhaust gas can be prevented while the detection precision can be maintained.

It should be noted that the usual LAF feedback is integrated in the above-described embodiment. However, in case where the desired value and/or the correction coefficient in the feedback system includes the frequency components in the neighborhood of the same frequency fid as the detecting-signal frequency, the detection precision of the output response may sometimes deteriorate. A countermeasure against this problem is to suspend the air-fuel ratio feedback operation and/or the calculation of the desired value of air-fuel ratio feedback which are determined based on the output of the exhaust gas sensor or to delay the response of the feedback during the execution of the catalyst degradation diagnostic process, as shown in a feedback suspension determining process in FIG. 9, so that the feedback system may not include the frequencies in the neighborhood of fid.

Figure 9:
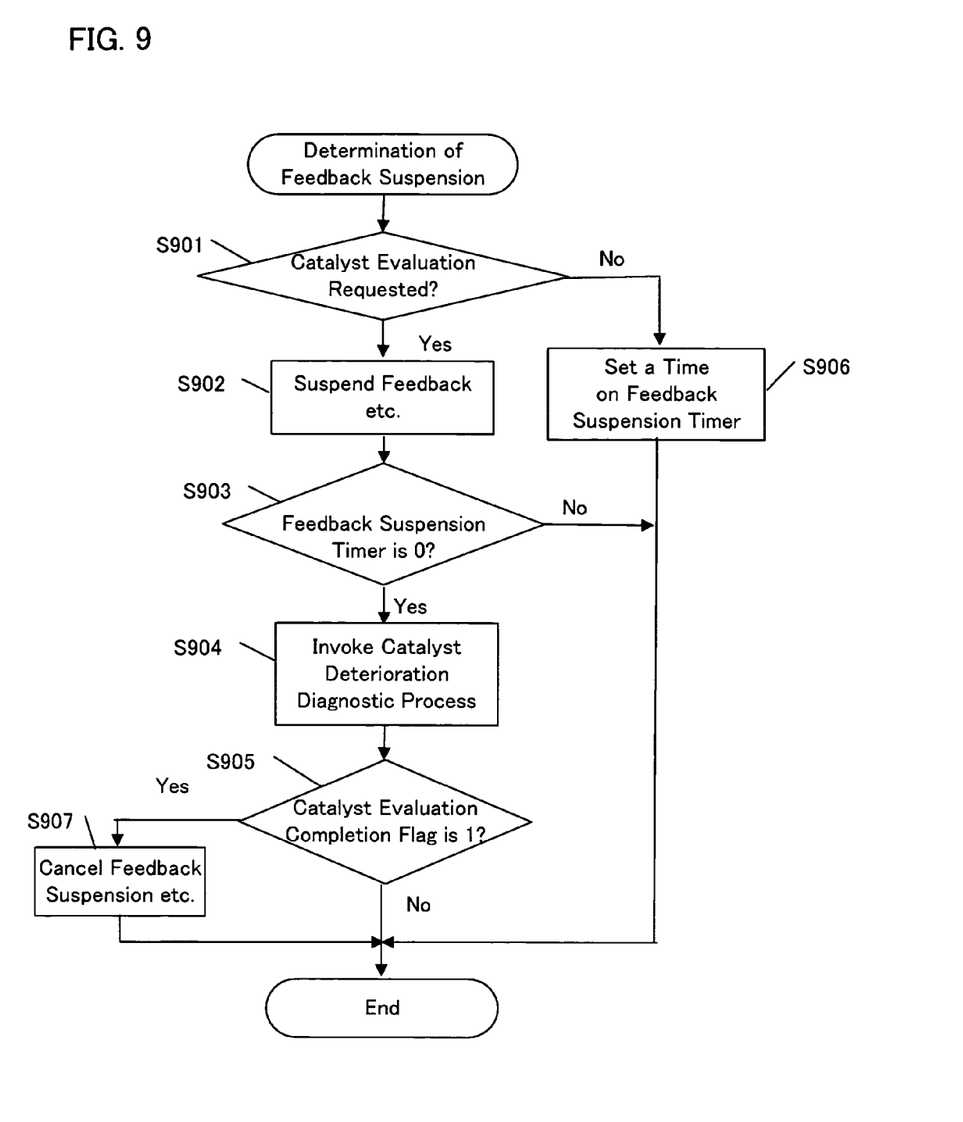

A process for determining the feedback suspension will be described with reference to FIG. 9. When the process for determining the feedback suspension is initially invoked from the main program, the process first checks a catalyst evaluation request flag to determine whether the catalyst evaluation is requested (S901). When the evaluation is not requested, the catalyst evaluating unit 203 proceeds the process to Sep S906, in which the unit 203 sets a predetermined time on a feedback suspension timer and starts a countdown. Then, this process is terminated.

When the feedback suspension determining process is invoked again, the catalyst evaluating unit 203 determines again whether the catalyst evaluation is requested (S901). When the catalyst evaluation request flag is set to 1, indicating that the evaluation is requested, the catalyst evaluating unit 203 requests the feedback compensation unit to suspend the feedback (S902). Then, in Step S903, the unit 203 determines whether the feedback suspension timer is 0. Currently, the predetermined time is not elapsed after the catalyst evaluation request has been issued and accordingly the feedback suspension timer is not 0. So, the unit 203 terminates the process. On the other hand, when the feedback suspension timer is 0, the catalyst evaluating unit 203 invokes the feedback suspension determining process (S904). When the invoked feedback suspension determining process is completed, the catalyst evaluating unit 203 proceeds the process to Step S905, in which the unit 203 checks the catalyst evaluation completion flag that has been set or reset in the catalyst degradation diagnostic process, so as to determine whether the catalyst degradation diagnosis has been completed. When the catalyst degradation diagnosis is not completed, the process is terminated here. On the other hand, when the catalyst degradation diagnosis has been completed, the unit 203 proceeds the process to Step S907 to request the feedback compensation unit to cancel the suspension of the feedback so as to re-start the correction of the fuel injection amount INJ through the feedback operation. Then, the process is terminated.

Furthermore, in case where the exhaust gas sensors are disposed both downstream and upstream of the catalyst, there may be provided a feedback desired value calculating unit having an after-catalyst A/F ratio control algorithm and a feedback compensator that performs an adaptive type of before-catalyst A/F ratio control for obtaining a feedback coefficient KAF from both of an equivalence ratio KACT and a feedback desired value that is output from the feedback desired value calculating unit, as shown in FIG. 8. Since the calculation of the feedback desired value and the adaptive type of before-catalyst A/F ratio control are disclosed in, for example, the Japanese Patent Application Unexamined Publication (Kokai) No. 2003-195907, these techniques will not be described further in this document.

Even when such control is performed, the detection precision may deteriorate in association with the response to be output when the desired value in the feedback system includes the components in the neighborhood of the same frequency fid as the detecting-signal. In such case, the following methods (1) through (6) may be used as an alternative to the method in Step S902.

(1) To suspend the feedback of the before-catalyst exhaust gas sensor. With this method, the same frequency components as the detecting-frequency can be prevented from being included in the feedback coefficient, which contributes to preventing deterioration in the detection precision.

(2) To suspend the calculation of the feedback desired value for the after-catalyst exhaust gas sensor. With this method, the same frequency components as the detecting-frequency can be prevented from being included in the feedback desired value. As a result, such situation that the feedback coefficient utilizing the before-catalyst exhaust gas sensor may generate the detecting-frequency in the course of following the desired value can be not only prevented, but also the drift of the air-fuel ratio and the increase of the exhaust gas constituents can be prevented by the feedback utilizing the before-catalyst exhaust gas sensor.

(3) To perform both methods in above (1) and (2). With both suspension operations, not only the same effect as for the method (1) can be obtained, but also a wasted consumption of the ECU operation power resource which is caused by continued calculation of the desired value can be prevented while the before-catalyst feedback is suspended.

(4) To slow down the variation speed of the feedback coefficient for the before-catalyst exhaust gas sensor. The variation speed of the feedback coefficient can be slowed down by changing the parameters which are used to determine the feedback control speed for the before-catalyst exhaust gas sensor. With this method, since the same frequency components as the detecting-frequency can be prevented from being included in the feedback coefficient, the deterioration of the detection precision can be prevented. Besides, through the feedback operation utilizing the before-catalyst exhaust gas sensor, the drift of the air-fuel ratio can be prevented more effectively and the increase of the exhaust gas constituents can be also suppressed more than when the feedback is suspended.

(5) To slow down the variation speed of the desired value of the after-catalyst exhaust gas sensor feedback. The variation speed of the desired value can be slowed down by changing the parameters which are used to determine the control speed for calculating the feedback desired value for the after-catalyst exhaust gas sensor. With this method, the same frequency components as the detecting-frequency can be prevented from being included in the desired value. Accordingly, such situation that the feedback coefficient utilizing the before-catalyst exhaust gas sensor may generate the detecting-frequency in the course of following the desired value can be prevented, so that the deterioration of the detection precision can be prevented. Besides, the increase of the exhaust gas constituents can be suppressed by the feedback utilizing the before-catalyst exhaust gas sensor.

(6) To slow down both control speeds of the above (4) and (5) by changing the parameters to be used to determine those control speeds. With this method, both effects of the above (4) and (5) can be obtained. Specifically, since the same frequency components as the detecting-frequency can be prevented from being included in the feedback coefficient, the deterioration of the detection precision can be prevented. Besides, through the feedback operation utilizing the before-catalyst exhaust gas sensor, the drift of the air-fuel ratio can be prevented more effectively and the increase of the exhaust gas constituents can be also prevented more than when the feedback is suspended.

With these methods, the problem of deterioration in the detection precision can be resolved equivalently as described above.

According to the present invention, the influence of the frequency components in the neighborhood of the same frequency fid as the detectng-signal can be excluded from the feedback coefficient variation by adopting the above-described methods during the evaluation of the responsiveness in the degradation failure determination process for the catalyst. Thus, the deterioration in the detection precision that is caused by combining the catalyst deterioration determination with the air-fuel ratio feedback can be prevented and the detection precision for the catalyst deterioration can be improved.

What is claimed is:

1. A deterioration diagnostic device for diagnosing a deterioration condition of an exhaust gas purifier disposed in an exhaust passage in an internal-combustion engine based on an output of a first exhaust gas sensor that is disposed downstream of the exhaust gas purifier, comprising:
   detecting-signal generating means for generating a detecting-signal having particular frequency components and multiplying the generated detecting-signal by a basic fuel injection amount so as to calculate a fuel injection amount, said detecting-signal being a fixed signal obtained by adding a single trigonometric function wave or a composite wave formed by two or more trigonometric function waves to a predetermined offset value;
   exhaust gas purifier evaluating means for extracting a frequency response corresponding to the fixed detecting-signal from an output of the first exhaust gas sensor of the engine, the output being in response to the calculated fuel injection amount, so as to determine a condition of the exhaust gas purifier based on the extracted frequency response;
   a second exhaust gas sensor disposed upstream of the exhaust gas purifier in the exhaust gas passage;
   air-fuel ratio controlling means for controlling an air-fuel ratio to be supplied to the engine to a predetermined value based on at least an output of the second exhaust gas sensor,
   wherein the fuel injection amount is corrected in accordance with a feedback coefficient that is determined based on the output of the second exhaust gas sensor; and
   responsiveness evaluating means for performing a band-pass filtering of an output from the first exhaust gas sensor.

2. The deterioration diagnostic device claimed as in claim 1, wherein the exhaust gas purifier evaluating means determines the condition of the exhaust gas purifier when a predetermined time elapses since the fuel injection amount has been supplied to the engine.

3. The deterioration diagnostic device claimed as in claim 1, wherein the exhaust gas purifier evaluating means determines the condition of the exhaust gas purifier using the output from the first exhaust gas sensor which has been band-pass filtered.

4. The deterioration diagnostic device claimed as in claim 3, wherein the exhaust gas purifier evaluating means determines that the exhaust gas purifier is in failure when a value obtained by an integral calculation or a smoothing calculation of absolute values of the band-pass filtered outputs of the exhaust gas sensor exceeds a predetermined value.

5. The deterioration diagnostic device claimed as in claim 1, wherein the air-fuel ratio controlling means adjusts a predetermined parameter in the air-fuel ratio controlling means so as to suspend the control of the air-fuel ratio or slow down a changing speed of the feedback coefficient when supplying the fuel injection amount to the engine.

6. A method for diagnosing a deterioration condition of an exhaust gas purifier disposed in an exhaust passage in an internal-combustion engine based on a sensor value of an exhaust gas sensor disposed downstream of the exhaust gas purifier, comprising the steps of:
   generating a detecting-signal having particular frequency components and multiplying the generated detecting-signal by a basic fuel injection amount so as to calculate a fuel injection amount, said detecting-signal being a fixed signal obtained by adding a single trigonometric function wave or a composite wave formed by two or more trigonometric function waves to a predetermined offset value;
   extracting a frequency response corresponding to the fixed detecting-signal from an output of the exhaust gas sensor of the engine, the output being in response to the calculated fuel injection amount, so as to determine a condition of the exhaust gas purifier based on the extracted frequency response;

controlling an air-fuel ratio to be supplied to the engine to a predetermined value based on at least an output of a second exhaust gas sensor disposed upstream of the exhaust gas purifier in the exhaust gas passage; and performing a bandpass filtering of an output from the first exhaust gas sensor;

wherein the fuel injection amount is corrected in accordance with a feedback coefficient that is determined based on the output of the second exhaust gas sensor.

* * * * *